Sept. 6, 1966  G. P. SCHOONMAKER ET AL  3,271,049
VEHICLE TOW BAR
Filed April 7, 1964
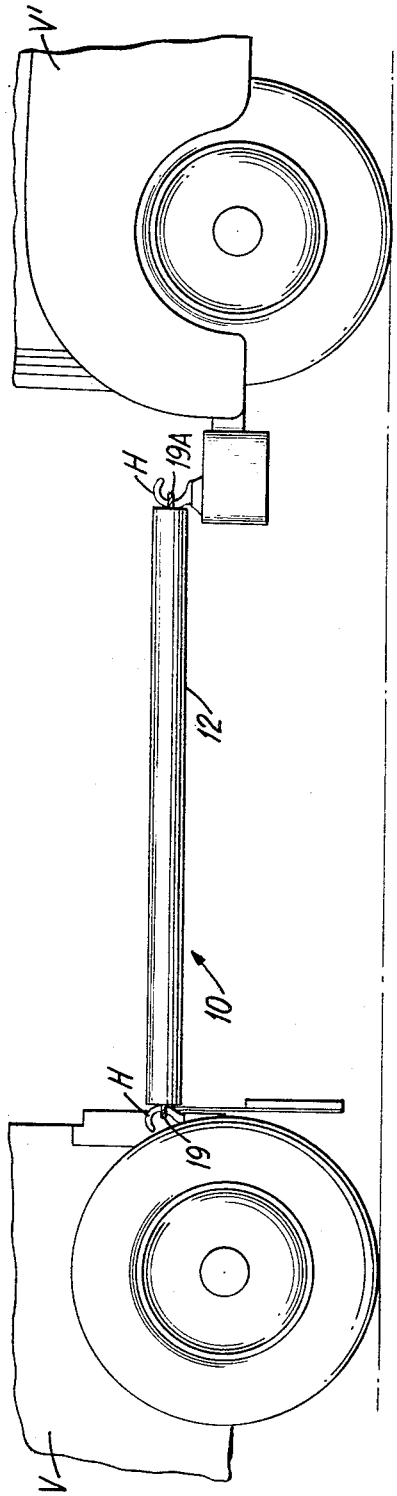
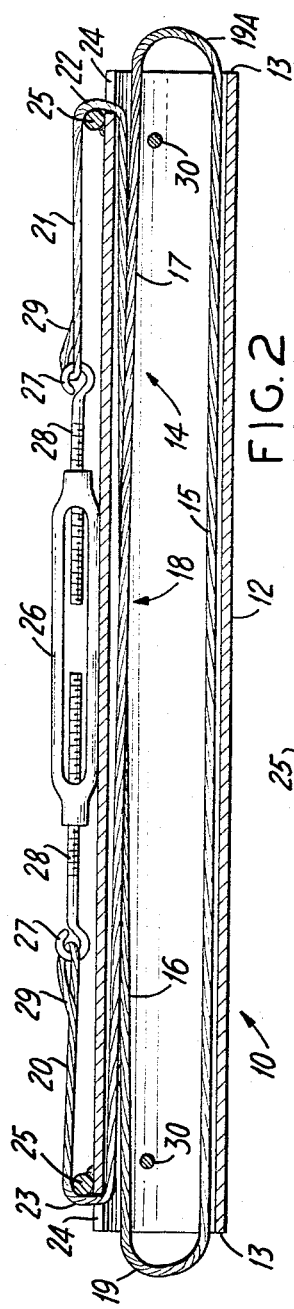
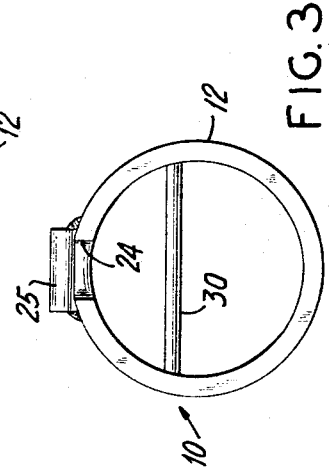
INVENTORS
GEORGE P. SCHOONMAKER
ANDREW M. SCHOONMAKER
BY
ATTORNEY

United States Patent Office 3,271,049
Patented Sept. 6, 1966

3,271,049
VEHICLE TOW BAR
George P. Schoonmaker, R.R. 2, Roscoe, N.Y., and Andrew M. Schoonmaker, 4 Tandler Ave., Conklin, N.Y.
Filed Apr. 7, 1964, Ser. No. 357,955
6 Claims. (Cl. 280—493)

This invention relates generally to towing means and more particularly to a readily attachable and detachable tow bar for use in towing vehicles of all sizes including very heavy trucks.

Tow bars are well known in the art and usually are characterized by a number of objectionable features. Among these are: a difficulty of attachment of the device to the vehicles to be interconnected; an inability to use the device for both pulling and pushing; a structure which becomes loosened during use so as to become prone to accidental detachment; or if tight enough to prevent accidental displacement, relative turning movement between the towing and towed vehicles is prevented.

Accordingly, the chief object of the present invention is to provide an improved tow bar structure which obviates the objectionable features characterizing known structures.

An important object of the present invention is to provide an improved tow bar which may be readily attached to or detached from towing and towed vehicles.

A further important object of the present invention is to provide an improved tow bar which will readily and detachably connected two vehicles for towing or pushing operations and permit relative turning movements therebetween.

Another important object of the invention is to provide an improved tow bar of simplified construction which is susceptible of ready and economical manufacture and which will be rugged and of long life in use.

Other objects and advantages of the present invention will become apparent during the course of the following description.

In the drawings, FIG. 1 is a side elevational view of the tow bar comprising the present invention in operative position connecting two vehicles;

FIG. 2 is a central vertical, longitudinal sectional view of the tow bar to an enlarged scale; and FIG. 3 is an end view thereof with the cable omitted.

Referring in detail to the drawing, 10 designates a tow bar embodying the invention. The same comprises a tubular member 12 of suitable predetermined length with opposite open ends 13 and having a wall thickness to make the same rigid and resistant to stresses and strains incident to its use.

A stranded steel wire cable 14 is looped and disposed interiorly of the tubular member 12; the looped cable including a medial portion 15, having a length about equal to the length of member 12, inturned portions 16, 17, crossing each other at a midpoint 18 and forming end loops 19, 19A which project outwardly of the opposite ends of member 12. The cable 14 further includes outer end portions 20, 21 directed toward each other with bight portions 22, 23 connecting the same with portions 16, 17 respectively. Bight portions 22, 23 project through short slots 24 extending longitudinally from opposite ends of tubular member 12. The bight portions 22, 23 pass over transversely disposed short guide rods 25 welded to the outer surface of member 12 at the base of slots 24, thereby locating the cable end portions 20, 21 in raised relation to the outer surface of member 12 and in alignment with each other.

The adjacent cable end portions 20, 21 are interconnected by a turnbuckle 26, the ends of end portions 20, 21 being looped through the eyes 27 of the reversely threaded turnbuckle screws 28. Preferably the looped ends 29 of the cable portion 29 are spliced by interweaving the strands of the cable ends 29 with the strands of the body portion of cable portions 20, 21, thereby insuring a sress resistant connection between turnbuckle screws 28 and the cable end portions 20, 21.

It will be apparent that the rotation of the turnbuckle 26 in one direction will draw the cable ends 20, 21 together, and in turn displace the cable loops 19, 19A inwardly with respect to the ends 13 of tubular member 12. Cross rods 30 are located transversely within the tubular member 12 adjacent ends 13 and are welded in place; said rods 30 pass through loops 19, 19A so as to prevent said cable loops from being retracted within member 12 to inaccessible positions within member 12.

Heavy vehicles such as trucks, and the like, are commonly provided with a pair of laterally spaced towing hooks H respectively on their front and rear ends. Other vehicles may have improvised or hook studs arranged on their front or rear bumpers for towing purposes.

The tow bar comprising the present invention while suited for use with vehicles of any size, is particularly adapted for use in towing heavy trucks weighing up to 25 tons when loaded. In such application, it has been found that a six foot length of 3 inch diameter pipe with a twenty-four foot ½ inch steel cable is adequate and either one or two tow bars may be successfully used.

In use, the tow bar 10 is placed between the two adjacent vehicles V, V' to be connected thereby and the loop ends 19, 19A of the cable 14 projecting from the ends of the bar 10 are passed over the hook H of each vehicle (FIGS. 1 and 2), the turnbuckle 26 first having been turned in a direction to loosen the cable 14 to provide the necessary slack at loop ends 19, 19A.

The turnbuckle 26 is now turned in a direction to draw the cable portions 16, 17 and 20, 21 together and thereby draw the vehicles V, V' toward each other until the ends of the bar 12 engages both of the hooks H or their supports as shown in FIG. 1 so that all slack is removed.

The loops 19, 19A in engaging relation to hooks H to tightly abut the same against bar ends 13, provide a substantially integral connection between the vehicles V, V' and bar 10. As now connected, the towed vehicle may be pushed or pulled depending on whether it is ahead or behind the towing vehicle. If the latter is ahead, it may back up and push the towed vehicle. The tow bar does not interfere with relative turning movements between the vehicles as the cable loops 19, 19A over the hooks H permits the swinging motion.

Furthermore, it has been found that the crossed disposition of cable portions 16, 17 relative to medial cable portion 15 and end cable portions 20, 21 is highly effective in distributing stresses arising in the towing operation, and particularly, the maximized stresses incident to the initiation of the towing operation.

It will now be readily apparent that the tow bar comprising the present invention is simple but rugged in construction, enables vehicles to be drawn together for towing without end play while remaining flexible enough to allow for turns, cannot become loose in use, and may be readily operably connected and disconnected by the turnbuckle to tighten or loosen the looped cable within the rigid pipe.

It is to be understood that the form of my invention herewith shown and described is to be taken as an illustrative example of the same and that various changes may be resorted to without departure from the spirit of the invention or the scope of the appended claims.

What is claimed is:

1. A tow bar for connecting two vehicles having towing elements, said bar comprising a rigid tubular member adapted to extend between the towing elements of said vehicles, a looped cable positioned within said tubular member and including looped portions projecting from the opposite ends of said tubular member and adapted to engage said towing elements, said cable further including opposed end portions disposed exteriorly of said tubular member, and means located exteriorly of said tubular member for engaging the opposed cable end portions and drawing the same together to thereby tighten said cable looped portions about said towing elements and bringing said towing elements into close abutting relation to the opposite ends of said tubular member.

2. A tow bar as in claim 1 wherein said means is a turnbuckle.

3. A tow bar as in claim 1 wherein the portions of said looped cable within said tubular member comprises a medial portion having a length substantially equal to the length of said tubular member, a pair of crossed portions extending respectively from the opposite ends of said medial portion, the ends of said crossed portions extending to the opposite ends of said tubular member, said opposed cable end portions extending respectively from the ends of said crossed cable portions.

4. A tow bar as in claim 3 wherein said tubular member is formed with guide slots in the opposite ends thereof for directing the cable end portions toward each other.

5. A tow bar as in claim 4 and further including abutment means at the base of the guide slots in said tubular member for curving the bight portions connecting the cable end portions and the crossed cable portions.

6. A tow bar as in claim 3 and further including stop means within the tubular member adjacent the opposite ends thereof for engaging said cable loops to prevent retraction of said cable loops to inaccessible positions within said tubular member.

References Cited by the Examiner

UNITED STATES PATENTS

| 2,223,677 | 12/1940 | Divelbiss | 280—493 |
| 2,417,871 | 3/1947 | Heuerman | 280—493 X |

FOREIGN PATENTS

| 517,154 | 2/1955 | Italy. |

LEO FRIAGLIA, *Primary Examiner.*